US012592642B2

(12) United States Patent
Al-Mufti

(10) Patent No.: US 12,592,642 B2
(45) Date of Patent: Mar. 31, 2026

(54) SYSTEM AND METHOD FOR A FEEDFORWARD DIRECT CURRENT VOLTAGE CONVERTER

(71) Applicant: Outdoor Wireless Networks LLC, Claremont, NC (US)

(72) Inventor: Khalid W. Al-Mufti, Sterling, VA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 353 days.

(21) Appl. No.: 18/278,290

(22) PCT Filed: Feb. 22, 2022

(86) PCT No.: PCT/US2022/017290
§ 371 (c)(1),
(2) Date: Aug. 22, 2023

(87) PCT Pub. No.: WO2022/187027
PCT Pub. Date: Sep. 9, 2022

(65) Prior Publication Data
US 2024/0128872 A1     Apr. 18, 2024

Related U.S. Application Data

(60) Provisional application No. 63/157,198, filed on Mar. 5, 2021.

(51) Int. Cl.
H02M 3/00 (2006.01)
H02M 3/158 (2006.01)

(52) U.S. Cl.
CPC ................................. H02M 3/1584 (2013.01)

(58) Field of Classification Search
CPC ...... G05F 1/62; G05F 1/00; G05F 1/46; H02J 3/26; H02J 3/28; H02M 1/08; H02M 1/084; H02M 3/158; H02M 3/1584
See application file for complete search history.

(56) References Cited

U.S. PATENT DOCUMENTS 9,448,576 B2     9/2016  Chamberlain et al.
10,222,814 B1     3/2019  Chakraborty et al.
10,812,664 B2    10/2020  Kostakis et al.
(Continued)

FOREIGN PATENT DOCUMENTS

KR        101663357 B1     10/2016
WO      2022187027 A1      9/2022

OTHER PUBLICATIONS

Frenger et al., A technical look at 5G energy consumption and performance, Ericsson Blog, Sep. 17, 2019, as downloaded Jul. 3, 2023 from https://www.ericsson.com/en/blog/2019/9/energy-consumption-5g-nr, pp. 1 through 13.
(Continued)

*Primary Examiner* — Ping Y Hsieh
(74) *Attorney, Agent, or Firm* — Fogg & Powers LLC

(57)     ABSTRACT

Techniques are provided for improving efficiency of a multiphase direct current (DC) voltage converter configured to provide DC power to a radio by varying a number of phases enabled and/or disabled about a time period based upon a number carriers to be transmitted by the radio during the time period.

18 Claims, 4 Drawing Sheets

220

(56) References Cited

U.S. PATENT DOCUMENTS

| | | | |
|---|---|---|---|
| 11,129,095 B2 | 9/2021 | Gandhi | |
| 2009/0224731 A1 | 9/2009 | Tang et al. | |
| 2018/0131263 A1 | 5/2018 | Sreenivas | |
| 2018/0131272 A1* | 5/2018 | Hume | H02J 1/00 |
| 2018/0198281 A1* | 7/2018 | Fluman | G05F 1/66 |
| 2020/0195145 A1* | 6/2020 | Schwabe | H02M 7/23 |

OTHER PUBLICATIONS

Frenger et al., Radio network energy performance: Shifting focus from power to prediction, Ericsson Review, Feb. 2014, Feb. 18, 2014, pp. 1 through 10.

International Searching Authority, "International Search Report and Written Opinion", from PCT Application No. PCT/US2022/017290, Jun. 7, 2022, pp. 1 through 12, Published: WO.

Tran, Martina, "Energy Consumption Optimizations for 5G networks", Masters Thesis Uptec F 19056, Uppsala Universitet, Uppsala, SE, Oct. 2019, pp. Cover through 57.

Yan et al., "Modeling the Total Energy Consumption of Mobile Network Services and Applications", Energies, 2019, 12, 184, Jan. 7, 2019, pp. 1 through 18.

Frenger et al., "Assessment of Alternatives for Reducing Energy Consumption in Multi-RAT Scenarios", 2014 IEEE 79th Vehicular Technology Conference (VTC Spring), Seoul, Korea (South), May 18-21, 2014, pp. 1 through 5.

* cited by examiner

440

SYSTEM AND METHOD FOR A FEEDFORWARD DIRECT CURRENT VOLTAGE CONVERTER

CROSS-REFERENCE TO RELATED APPLICATIONS

This patent application claims priority to International Patent Application No. PCT/US2022/017290, filed on Feb. 22, 2022, which claims benefit of U.S. Patent Application Ser. No. 63/157,198, filed Mar. 5, 2021; the entire contents of the aforementioned patent application are incorporated herein by reference as if set forth in its entirety.

BACKGROUND

A direct current (DC) voltage converter may be used to modify a DC voltage level provided on a power cable electrically coupling a direct current (DC) electrical power supply (or DC power supply) to a radio. By increasing the DC voltage provided to the power cable, current flow, and thus dissipative power loss, in the power cable is reduced. Techniques for doing so are described in U.S. Pat. No. 9,448,576, which is hereby incorporated by reference herein in its entirety. Voltage converters have imperfect, i.e., less than one hundred percent, efficiency when converting an input DC voltage level to an output DC voltage level. The imperfect efficiency or power loss may be due, at least in part, to power dissipation. The power loss in the DC voltage converter offsets a reduction of power dissipation in the power cable. Therefore, there is a need to enhance efficiency in the DC voltage converter.

SUMMARY

A method of more efficiently operating a multiphase direct current (DC) voltage converter configured to provide DC power to a radio is provided. The method comprises: synchronizing time, kept by the multiphase DC voltage converter, with a network comprising the radio; determining with a model, or receiving, at least one indicium of DC power consumption of the radio for a time period in a future; determining, for the time period, at least one of (a) a first number of at least one phase of the multiphase DC voltage converter to enable, and (b) a second number of at least one phase of the multiphase DC voltage converter to disable; and at least one of (a) enabling the first number of the at least one phase at one of: (i) a first time epoch before a commencement of the time period and (ii) at a commencement of the time period, and (b) disabling the second number of the at least one phase at one of: (x) a second time epoch after the commencement of the time period and (y) at the commencement of the time period.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
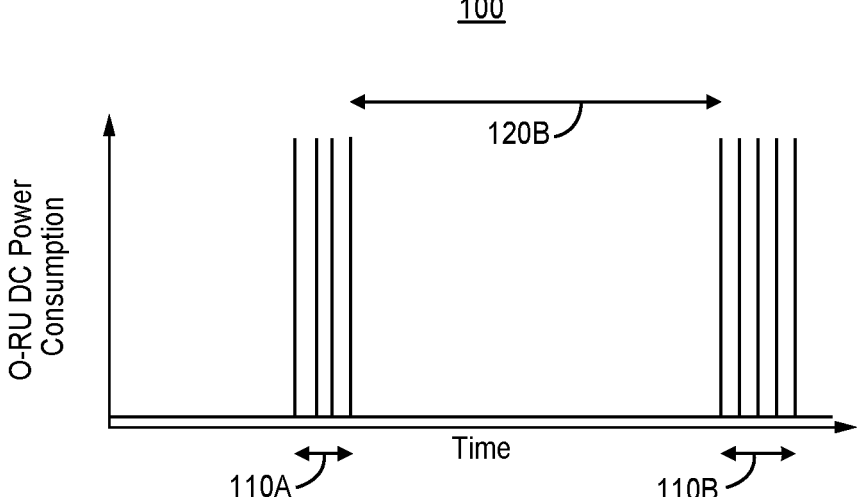
FIG. 1 illustrates an example of O-RU DC power consumption over time.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical, and electrical changes may be made without departing from the scope of the present invention. The following detailed description is, therefore, not to be taken in a limiting sense.

Embodiments of the present invention provide techniques for diminishing power loss in a DC voltage converter used to supply power to a radio in a radio system. Power loss in the DC voltage converter, i.e., a multiphase DC voltage converter, is diminished by enabling and/or disabling (during a period of time, e.g., a time block) at least one phase (phase(s)) of a multiphase DC voltage converter so that only a number of phase(s) needed to provide power required by a radio are utilized.

The multiphase DC voltage converter may be a buck, boost, or buck-boost converter. Each phase of the multiphase DC voltage converter is configured to deliver an equal amount of DC power, e.g., DC current and DC voltage, at an output of the corresponding phase. The number of phase(s) needed to provide power required by the radio at a time period may be determined by ascertaining a minimum number of phases, which when enabled, provides a DC power output from the multiphase DC voltage converter that delivers a power level to the radio that is equal to or greater than at least the DC radio power consumption predicted to be consumed at the period of time. Optionally, e.g., when the multiphase DC voltage converter is remotely locate from the radio, then the DC power provided from the multiphase DC voltage converter must be equal to or greater than a sum of the DC radio power consumption predicted to be consumed at the period of time and the power dissipated in the conductors electrically connecting the DC voltage converter to the radio.

A scheduler is configured to provide an amount of future downlink data, e.g., a number of resource elements, to be transmitted by the radio and a corresponding period of time, e.g., a time block, are provided to a radio DC power consumption model (model) from a scheduler. The model is configured to determine at least one indicium of DC radio power consumption for each one of corresponding period(s) of time, e.g., a time block(s), when the radio transmits downlink data. The at least one indicium may include a DC radio power consumption, specific phase(s) and/or a number of phase(s) to be enabled, and/or specific phase(s) and/or a number of phase(s) to be disabled. The specific phase(s) and/or a number of phase(s) to be enabled, and/or specific phase(s) and/or a number of phase(s) to be disabled, may be derived from the DC radio power consumption determined by the model and based upon knowledge of the amount of DC current, e.g., DC power, which can be delivered by each phase of the multiphase DC voltage converter. The model is further configured to provide the at least one indicium and corresponding period of time, e.g., a time block, for each period of time to the multiphase DC voltage converter. At or just before commencement of the corresponding period of time, the multiphase DC voltage converter is configured to utilize the at least one indicium to enable a number of phase(s) based upon the received indicium for the corresponding period of time so that the multiphase DC voltage converter is configured to provide an amount of DC power required by the radio to transmit data scheduled to be transmitted at the corresponding time period. Thus, the multiphase DC voltage converter is configured to provide a larger amount of DC power to the radio when the radio transmits a larger amount of data) and requires such DC power. However, the multiphase DC voltage converter is configured to provide a smaller amount of DC power to the radio transmits a smaller amount of data, e.g., no data. As a result, the efficiency of the multiphase DC voltage converter is increased.

For pedagogical purposes, a radio access network illustrated herein is a 5G radio access network configured to satisfy the open radio access network (O-RAN) Alliance specifications ("O-RAN specifications"). However, the invention may be used to implement other types of radio access networks (e.g., other types of cellular systems or fixed wireless access systems) capable of providing feedforward data to a multiphase DC voltage converter. The O-RAN specifications include without limitation the O-RAN fronthaul working group control, user and synchronization plane specification (ORAN-WG4.CUS.0-V04.00) and O-RAN Alliance working group 4 management plane specification (ORAN-WG4.MP.0-v04.00.00); these O-RAN specifications are hereby incorporated by reference herein in their entirety.

The O-RAN specifications permit interoperability of RAN components, e.g., O-RAN specification compliant radios (or O-RAN radio units (O-RU) or O-RAN radios) and an O-RAN specification compliant distributed units (or O-RAN distributed units), made by different vendors. An O-RU is a specific type of radio illustrated herein for pedagogical purposes. The O-RAN distributed unit may be executed on a server system, e.g., local server network(s) and/or cloud computing system(s). The O-RAN specifications utilize message protocols to communicate between O-RAN compliant radios and O-RAN compliant virtual. A virtual baseband unit processes, e.g., encodes, baseband data received from and sent to radio(s). The virtual baseband unit and radio(s) are components of a radio system. For purposes of clarity, the embodiments of the invention are illustrated as being implemented with a virtual baseband; however, the invention may be implemented with any type of baseband unit.

A virtual baseband unit processes, e.g., encodes, baseband data received from and sent to radio(s). The virtual baseband unit and radio(s) are components of a communications system such as a cellular communications system and/or a fixed wireless access communications system that provides point to point communications.

Communications between a radio and a virtual baseband unit are facilitated using an input/output (I/O) data protocol used by the radio and the virtual baseband unit. The I/O data protocol is a protocol used to convey messages, e.g., in a user plane, a control plane, a synchronization plane, and/or a management plane; however, one or more alternative planes may be used in lieu of the foregoing. IEEE1914.3 compliant communications protocol, Common Public Radio Interface (CPRI), Enhanced CPRI (eCPRI) are examples of I/O data protocols; however, other I/O data protocols may be used.

Each message protocol has a format, i.e., a syntax with one or more variables. Data about at least one radio characteristic, e.g., DC power consumed by the radio, may be obtained from a radio by sending it a message.

Optionally, the virtual baseband unit is an O-DU; however, the virtual baseband unit may be another type of virtual base band unit. For pedagogical purposes, an O-DU is illustrated herein. However, embodiments of the invention are applicable to other types of virtual base band units. A virtual baseband unit means a baseband unit configured to be executed on server(s) and/or in a cloud computing system, and to be communicatively coupled to at least one radio.

For pedagogical purposes, the radio illustrated herein is an O-RAN compliant radio unit (O-RU) and the virtual baseband unit illustrated herein is an O-RAN compliant distributed unit (O-DU). However, in other embodiments of the invention, the radio and/or the virtual baseband unit can be compliant with other, and thus may not be an O-RU and/or an O-DU. Also, a baseband unit, i.e., a physical baseband unit, rather than a virtual baseband unit can be used in lieu of a virtual baseband unit.

Communications between a radio and a virtual baseband unit are facilitated using an input/output (I/O) data protocol used by the radio and the virtual baseband unit. The I/O data protocol is a protocol used to convey messages, e.g., in a user plane, a control plane, a synchronization plane, and/or a management plane; however, one or more alternative planes may be used in lieu of the foregoing. CPRI and eCPRI are examples of I/O data protocols.

Each message protocol has a format, i.e., a syntax with one or more variables. Data about at least one radio characteristic, e.g., DC power consumed by the radio, may be obtained from a radio by sending it a message.

Optionally, the virtual baseband unit is an O-DU; however, the virtual baseband unit may be another type of virtual base band unit. However, embodiments of the invention are applicable to other types of virtual base band units. A virtual baseband unit means a baseband unit configured to be executed on server(s) and/or in a Cloud computing system, and to be communicatively coupled to at least one radio.

Thus, the subsequently described radio access network is illustrated, for pedagogical purposes, as having 5G compliant O-RAN compliant components, e.g., an O-DU and an O-RU. However, other embodiments of the invention may utilize RAN components conforming to standards other than those exemplified herein. Thus, in other embodiments of the invention, the radio and/or the virtual baseband unit may not be an O-RU and/or an O-DU, but other types of component(s).

The virtual baseband unit, or another component of the communications system, e.g., a central unit, comprises a scheduler. The scheduler determines when downlink data is sent from the virtual baseband unit to the O-RU for transmission. Thus, the scheduler schedules transmission of downlink data (from the O-RU to user equipment wirelessly and communicatively coupled with the O-RU) in time and frequency blocks. By creating such a schedule of downlink data transmission, the scheduler knows when downlink data will be transmitted by the O-RU and a number of carrier waves or subcarriers transmitted at any time period.

Resource element that is transmitted by an O-RU means a subcarrier, e.g., a carrier wave, that is modulated by non-zero data which may be represented by amplitude and/or phase, e.g., in-phase (I) and quadrature phase (Q), components. Optionally, for 4G Long Term Evolution (LTE) compliant radios, data is sent in frames. Optionally, each frame comprises twenty sub-frames, where each sub-frame comprises two slots. Optionally, each slot is one half a millisecond in time length. Optionally, each slot comprises seven blocks of time, where optionally an orthogonal frequency division multiplexing (OFDM) symbol may be communicated during a block of time; optionally, each such block of time is about 0.714 millisecond in time length. Optionally, during each time block, there are multiple, e.g., multiples of twelve (or n*12), resource elements which represent the OFDM symbol. Optionally, unique data or data represented by a symbol in a resource element can be sent during a time block by an O-RU to user equipment in a downlink path.

To diminish energy consumption, future 5G radios are expected to be placed in a low power or a deep sleep state when not transmitting downlink data. FIG. 1 illustrates an example of O-RU DC power consumption over time 100. Optionally, during brief periods of time 110A, 110B data or signaling signals are transmitted in a downlink path to user equipment, and O-RU DC power consumption spikes and is relatively large during each spike. Optionally, during a lengthier period of time 120B, no such signals are transmitted, and the O-RU DC power consumption is relatively low, e.g., in a low power state.

DC power consumption of an O-RU is dominated by power consumed by power amplifier(s) of the O-RU. The power amplifier(s) are used to amplify downlink signals comprising frequency translated downlink data, e.g., symbols modulated on respective subcarriers. Downlink data may comprise signaling signals and data signals, each of which are communicated in resource elements. The signaling signals are periodically or aperiodically broadcast signals that (a) are used to align frame timing between an O-RU and user equipment and (b) include an identifier, e.g., a cell identifier, of the O-RU. Thus, when downlink signals are transmitted, power consumption of the O-RU increases dramatically.

The DC power consumption of an O-RU can be modelled based upon a number of resource elements transmitted at any time period. Optionally, DC Power Consumption of an O-RU, PO-RU, may be modeled to be:

$$P_{O\text{-}RU} = P_{OR\text{-}U\_data} + P_{OR\text{-}U\_signaling} = (nd, O\text{-}RU^* \\ T d(t) + (ns, O\text{-}RU^* Rs(t)),$$

where nd, O-RU is power (e.g., in Watts) consumed by one bit per second of data rate in the O-RU at time t, Td(t) is a data rate (e.g., in bits per second) in the downlink path, i.e., transmitted by the O-RU, ns, O-RU is energy (e.g., in Joules) consumed by one resource element (or one sub-carrier during a time block) in the O-RU, and Rs(t) is an average signaling resource element(s) per second transmitted by the O-RU. A bit means non-zero data modulated on a subcarrier in a resource element and which is transmitted by the O-RU in the downlink path. nd, O-RU and ns, O-RU may be provided by radio manufacturer or determined using DC power consumption data obtained from an O-RU during time period(s) and known amount of resource elements obtained from the scheduler and transmitted by the O-RU during the time period(s), e.g., using techniques illustrated elsewhere herein. Other models of O-RU power consumption may be used, e.g., a linear or non-linear equation whose parameters are determined, e.g., by with regression analysis, using the DC power consumption data obtained from the O-RU during time periods and a varying amount of resource elements transmitted during the time periods. Optionally, the RAN can send a predetermined, varying amount of resource elements over time periods; the resource elements may vary from zero or one resource element to a maximum number of resource elements, e.g., of a sub-frame. For example, the number of resource elements transmitted during successive time periods can be incrementally increased and/or decreased. Optionally, a model of O-RU DC power consumption model may be provided by a manufacturer of the O-RU. Once a model has been received or determined, the model can be used to provide at least one indicium of DC radio power consumption for future period(s) of time, e.g., time block(s), to the multiphase DC voltage converter.

Embodiments of the present invention provide techniques for diminishing power loss, and thus increasing power efficiency, in a multiphase DC voltage converter used to supply power to a radio of a radio access network. Each phase of the multiphase DC voltage converter is configured to deliver an equal amount of power, e.g., current, at an output of the corresponding phase; thus, optionally, each phase may be of the same design. By deactivating phases, the enabled phases may provide higher power, e.g., current, levels at a higher power efficiency. Efficiency of a phase may be determined by power output of the phase divided by power input of the phase. Power loss of a phase means power input of the phase less power output of the phase. At higher efficiency levels, each phase has a lower power loss.

Power loss in the multiphase DC voltage converter is diminished by enabling (during a period of time, e.g., a time block) a minimum number of phase(s) of the multiphase DC voltage converter needed to provide DC power required by a radio at the period of time. Enabling a phase means that the phase is configured to provide DC power, e.g., to the radio. Disabling a phase means that the phase is no longer configured to provide DC power to the radio, and thus generates little or no DC power loss. If all phases were used at all times, then the multiphase DC voltage converter would have decreased efficiency below, e.g., a high DC power output level.

Figure 2:
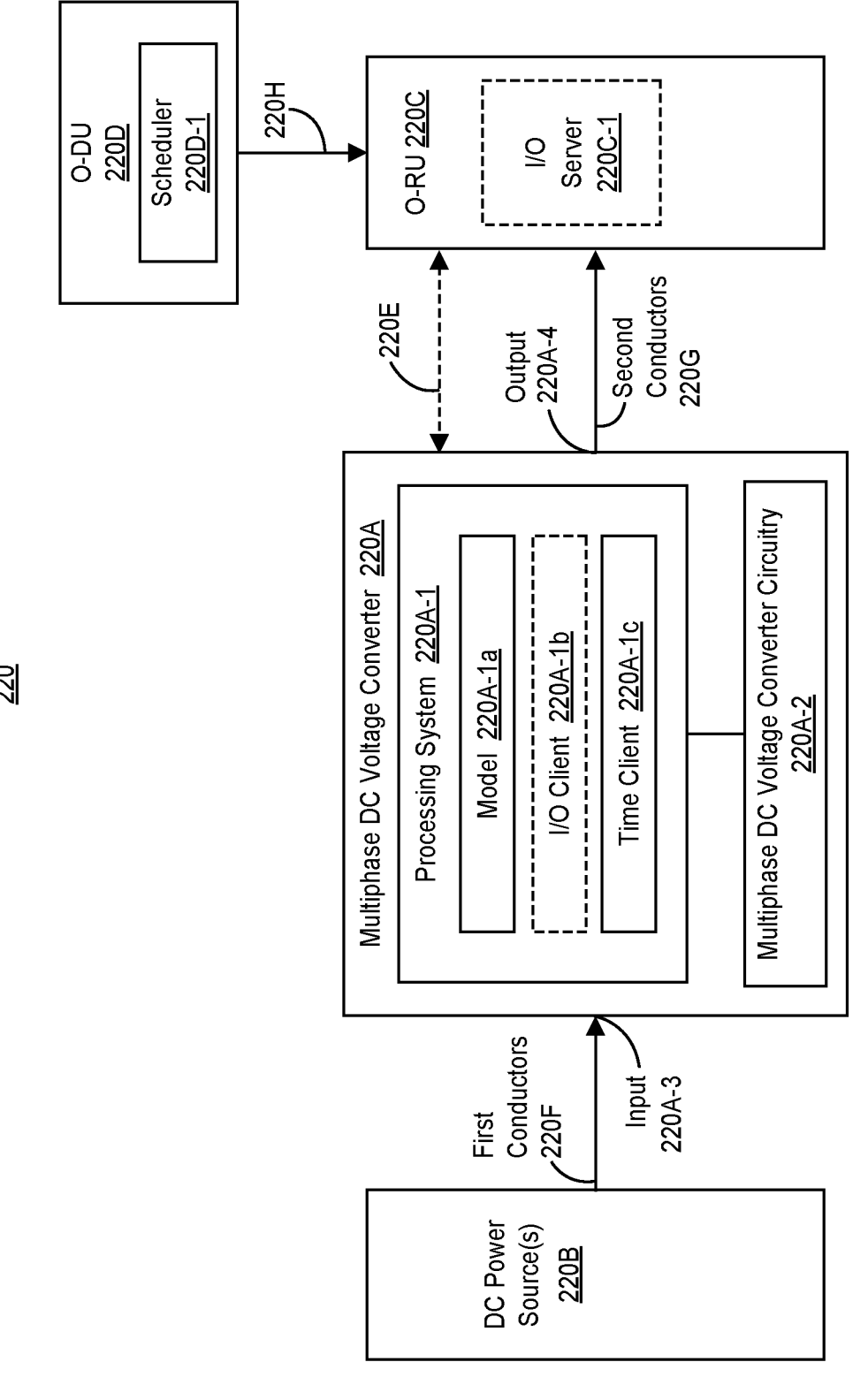
FIG. 2 illustrates a block diagram of one embodiment of a radio access network.

FIG. 2 illustrates a block diagram of one embodiment of a radio access network (RAN) 220. The RAN 220 comprises an O-RU 220C, an O-RAN compliant distributed unit (O-DU) 220D, a multiphase DC voltage converter 220A, and at least one DC power source (DC power source(s)) 220B. Optionally, the DC power source(s) 220B comprise at least one of an alternating current (AC) to direct current (DC) (AC/DC) power supply, at least one battery, and any other type of DC power source, e.g., solar cells. The DC power source(s) 220B are electrically connected to an input 220A-3 of the multiphase DC voltage converter 220A through first electrical conductors (first conductors) 220F; the first electrical conductors 220F are configured to provide DC power from the DC power source(s) 220B to the multiphase DC voltage converter 220A. The output 220A-4 of the multiphase DC voltage converter 220A is electrically connected to, e.g., a DC power input of, the O-RU 220C through second electrical conductors (second conductors) 220G. Each of the first electrical conductors 220F and the second electrical conductors 220G may comprise power cable(s), bus bar(s), wire(s) and/or other type of electrical conductors.

In the 5G radio access network designed according to the O-RAN specifications, the radio access network 220, includes an O-DU 220D configured to be coupled to at least one 0-RU 220C through a fronthaul gateway (FHG) communications link 220H compliant with the O-RAN specifications. The fronthaul gateway communications link 220H may be implemented with internet protocol and/or Ethernet networking technology. For pedagogical purposes, FIG. 2 illustrates a RAN 220 comprising a single O-RU 220C communicatively coupled to an O-DU 220D.

Downlink data sent to user equipment (wirelessly communicatively coupled to the O-RU 220C) is sent through the O-DU 220D (from the central network, through or not through an O-RAN compliant central unit (O-CU)) to the O-RU 220C. A central unit (CU) is discussed further elsewhere herein. Downlink data sent from such user equipment (wirelessly communicatively coupled to the O-RU 220C) is sent from the O-RU 220C through the O-DU 220D to the central network (through or not through an O-CU).

The O-DU is configured to host radio link control (RLC), medium access control, and physical (PHY) layers. Optionally, the O-DU is configured to host higher layer protocols, e.g., radio resource control, service data adaption protocol (SDAP), and packet data convergence protocol (PDCP); optionally, one or more of these services can be implemented in a central unit (CU). For a O-RAN compliant radio station, the CU may be an O-RAN compliant CU or O-CU; however, the radio, the virtual baseband unit, and the CU may be compliant with other standards and thus not be an O-CU. The O-DU is further configured to provide frequency domain baseband data, e.g., having in-phase and quadrature phase (I and Q) components. Thus, the O-DU has some functionality similar to 2G, 3G and/or 4G virtual baseband unit(s).

A data interface of the O-DU 220D (or O-DU interface) is configured to be coupled to either the central unit or a core network. The central unit is configured to be coupled between the O-RAN distributed unit and the core network. Optionally, the O-RAN distributed unit and/or the central unit are configured to be implemented in software executed on a server (or server circuitry) or a cloud computing system (or cloud computing system circuitry). Uplink and downlink data communicated through the O-DU interface comprises data in a user plane (U), a control plane (C), a synchronization plane (S), and/or a management plane (M). User plane data comprises voice and/or data transmitted to and from user equipment coupled to radio(s) of the RAN. Control plane data comprises messages used to control how a corresponding radio (receiving the control plane data) processes user plane In-phase and Quadrature-phase data stream in the uplink and downlink paths in real time. Synchronization plane data comprises data for synchronization and timing information between nodes (e.g., between a virtual baseband unit and a radio or between a modified fronthaul gateway and either a virtual baseband unit or a radio) of a RAN. Management plane data comprises data for operation, administration, and maintenance of radio(s), where such operation, administration, and maintenance is not required in real time. The control, synchronization, and/or management planes are bidirectional. Thus, a ping or a query sent in a one of the control, synchronization, and/or management plane in the downlink path may result in acknowledgement and/or responsive data the same plane in the uplink path.

Optionally, an O-RU 220C may be mounted on, e.g., at or near a top of, a mounting structure, e.g., a tower and/or another form of a mounting structure. DC power (or DC power) is electrically coupled from the DC power source(s) 220B to the O-RU 220C through the multiphase DC voltage converter 220A.

The multiphase DC voltage converter 220A is communicatively coupled to the RAN 220, e.g., through a communications link 220E, e.g., an Ethernet network, the O-RU 220C, the O-DU 220D, and/or at least one other component of the RAN 220, e.g., a network management system. For pedagogical purposes, the multiphase DC voltage converter 220A is illustrated as being communicatively coupled to the RAN 220 through the O-RU 220C. However, the multiphase DC voltage converter 220A may be communicatively coupled through another communications link (alternatively or additionally) to the O-DU or another component (e.g., a central unit or a network management system) of the RAN 220

The multiphase DC voltage converter 220A comprises a processing system 220A-1 communicatively coupled to multiphase DC voltage converter circuitry (or multiphase DC voltage conversion circuitry) 220A-2. For pedagogical purposes, the processing system 220A-1 is illustrated as comprising the model 220A-la, an optional input/output (I/O) client 220A-1b, and a time client 220A-1c. The processing system 220A-1 is configured to store and execute the model 220A-la, the optional input/output (I/O) client 220A-1b, and/or the time client 220A-1c. The model 220A-la, however, may be located in another component, e.g., of the RAN 220 or elsewhere, e.g., in a server computing system or a cloud computing system.

Optionally, the O-RU 220C comprises an input/output (I/O) server 220C-1. If the O-RU comprises the optional I/O server 220C-1, the I/O server 220C-1 may be executed by one or more processing systems (or processing circuitry) of the O-RU 220C.

The O-RU 220C is communicatively coupled to the O-DU 220D through the fronthaul gateway communications link 220H. The O-DU 220D is configured to send downlink data to the O-RU 220C. The O-RU 220C is configured to send uplink data to the O-DU 220D. Optionally, the O-DU 220D comprises a scheduler 220D-1.

If the processing system 220A-1 comprises the model 220A-la and parameters of the model 220A-la must be determined, O-RU DC power consumption data may be obtained by the processing system 220A-1 to determine the model parameters. The processing system 220A-1 is configured to receive, during different periods of time (or time blocks, during different time blocks and known downlink data, e.g., numbers of resources elements, transmitted by the O-RU 220C during the different time blocks (as described elsewhere herein) from the scheduler 220D-1, and O-RU DC power consumption data for at least some of the same periods of time. Optionally, the optional I/O client 220A-1b can be used to obtain O-R DC power consumption data and a corresponding periods of time (or time block or time) from the I/O server 220C-1 of the O-RU 220C. Optionally, the optional I/O client 220A-1b can be used to obtain the known downlink data and corresponding periods of time from another I/O server in the O-DU 220D. Optionally, the data communications protocol used to communicate between an I/O server and the I/O client 220A-1b may be a protocol such as NETCONF/YANG, Simple Network Management Protocol, Command Line Interface, or any other data communications protocol capable of facilitating communications between networked devices.

When using the received or determined model 220A-la, timing of the processing system 220A-1 must be synchronized with the RAN 220, e.g., the scheduler 220D-1. Typically, timing of components in the RAN 220, e.g., the scheduler 220D-1 and the O-RU 220C, is synchronized within one hundred nanoseconds or less, using synchronous Ethernet (SynchE) or precision time protocol (PTP). SynchE is compliant with International Telecommunications Union (ITU) Telecommunication standardization sector recommendations G.8261, G.8262, and G.8264. PTP is compliant with Institute of Electrical and Electronics Engineers (IEEE) standard 1588. Data received from the scheduler and the O-RU 220C must be time synchronized. The clock, e.g., grandmaster clock(s), may be located at the central unit, the baseband unit (e.g., virtual baseband unit), or elsewhere in the RAN 220 or a larger network including the RAN 220. Thus, the processing system 220A-1 of the multiphase DC voltage converter 220A comprises the time client 220A1-*c* to derive similar time accuracy, using which ever technique (e.g., SynchE or PTP) is used by the RAN 220 or network including the RAN 220, so that the processing system 220A-1 can be synchronized in time with the O-RU 220C (through a communications link, e.g., the communications link 220E, with the RAN 220); as a result, the multiphase DC voltage converter 220A provides the DC power esti- mated to be required by the O-RU 220C by the model 220A-1 and at the time identified by the scheduler 220D-1 and provided through the model 220A-1.

The scheduler 220D-1 may be located in a different component of the RAN 220, including in components, for example a central unit, not illustrated in FIG. 2. However, for pedagogical purposes, the scheduler 220D-1 is illustrated as being in the O-DU 220D. The scheduler 220D-1, the model 220A-la, an optional input/output (I/O) client 220A-1*b*, the time client 220A-1*c*, and/or the I/O server(s) may each be implemented in software executed on a processing system (or processing circuitry). Optionally, communica- tions between the I/O server 220C-1 and the I/O client 220A-1*b* are performed in the management plane.

The multiphase DC voltage converter 220A is configured to decrease or increase a first DC voltage level provided at an input (or input conductors) 220A-3 of the multiphase DC voltage converter 220A to a second voltage level at an output (or output conductors) 220A-4 of the multiphase DC voltage converter 220A. In one embodiment, the multiphase DC voltage converter 220A is located proximate to the DC power source(s) 220B and remotely located from the O-RU 220C. In this embodiment, the multiphase DC voltage converter 220A is configured to boost a lower voltage, e.g., a positive or negative 40-56V, to a higher voltage, e.g., respectively a positive or negative 54-60V. Boosting the lower voltage to a higher voltage, decreases the current flow through the second electrical conductors 220G to diminish power dissipation in the second electrical conductors 220G. Optionally, in this configuration, the multiphase DC voltage converter circuitry 220A-2 may be implemented with a multiphase boost voltage converter circuitry.

In another embodiment, the multiphase DC voltage con- verter 220A is located remote from the DC power source(s) 220B and proximate the O-RU 220C. In this embodiment, the multiphase DC voltage converter 220A is configured to reduce a higher voltage, e.g., positive or negative 100-320V, provided at the input 220A-3 to a lower voltage, e.g., positive or negative 40-56V, provided at the output 220A-4. The higher voltage decreases the current flow through the first electrical conductors 220F to diminish power dissipa- tion in the first electrical conductors 220F. Optionally, in this configuration, the multiphase DC voltage converter circuitry 220A-2 may be implemented with a multiphase buck volt- age converter circuitry.

Figure 3:
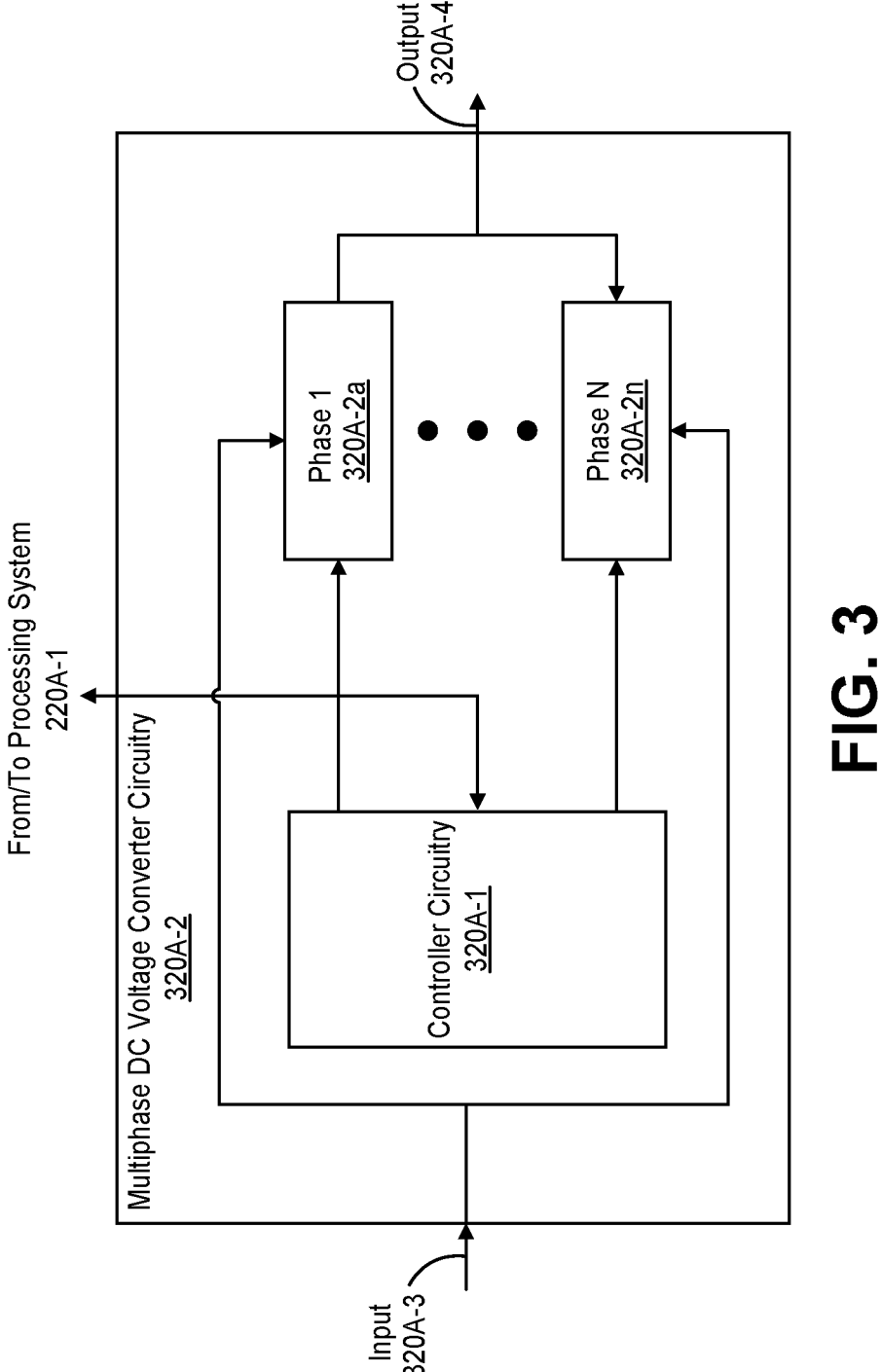
FIG. 3 illustrates one embodiment of a block diagram of a multiphase DC voltage converter circuitry.

FIG. 3 illustrates one embodiment of a block diagram of a multiphase DC voltage converter circuitry 320A-2. The multiphase DC voltage converter circuitry 320A-2 com- prises controller circuitry 320A-1 and N phases (or N phase circuits) 320A-2*a*, 320A-2*n*. The controller circuitry 320A-1 is configured to be communicatively coupled to the process- ing system 220A1. Optionally, the controller circuitry 320A-1 is configured to receive data from and/or provide data to the processing system 220A-1; optionally, received data may be data indicative of a DC power output to be provided by the multiphase DC voltage converter circuitry 320A-2 at about time of receipt of such data and/or data indicative of a number of phase(s) 320A-2*a*, 320A-2*n* to be enabled at about time of receipt of such data.

Optionally, the controller circuitry 320A-1 is configured to generate a pulse train signal using pulse width modula- tion. The controller 3210A-1 sets the pulse width of the pulse train to achieve a desired DC output voltage level at an output of each phase 320A-2*a*, 320A-2*n* (and thus an output (or output conductors 320A-4) of the multiphase DC voltage converter circuitry 320A-2).

Optionally, an input of each phase 320A-2*a*, 320-2*n* is configured to be electrically coupled, through an input (or input conductors) 320A-3 of the multiphase DC voltage converter circuitry 320A-2, to the DC power source(s) 220B. Optionally, each phase is functionally equivalent to every other phase. Optionally, each phase 320A-2*a*, 320A- 2*n* comprises at least one switch, e.g., a field effect transistor, and a low pass filter. An input to the at least one switch is configured to receive the pulse train, and generate a corre- sponding pulse train at a higher voltage level at an output of the at least one switch. The output of the switch is coupled to the low pass filter. Optionally, the low pass filter com- prises a series inductor electrically connected to at least one shunt capacitor. The low pass filter smooths the pulse train at the higher voltage level to the desired DC voltage level. The output of each phase 320A-2*a*, 320A-2*n*, e.g., of each low pass filter, is configured to be electrically coupled to the output 320A-4.

Figure 4:
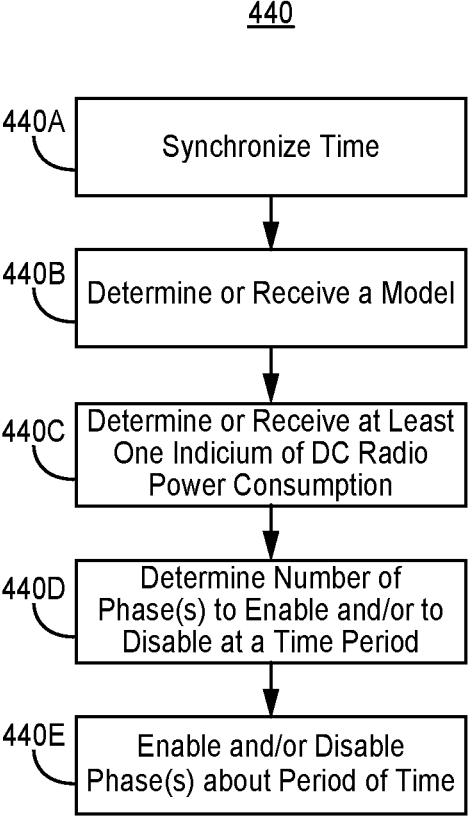
FIG. 4 illustrates a flow diagram of one embodiment of a method of determining a resistance of a radio power electrical conductors.

FIG. 4 illustrates a flow diagram of one embodiment of a method 440 of determining a resistance of a radio power electrical conductors. Method 440 may be implemented via the techniques described with respect to FIGS. 2 and 3, but may be implemented via other techniques as well; imple- mentation of method 440 with respect to FIGS. 2 and 3 is for pedagogical purposes. The blocks of the flow diagram have been arranged in a generally sequential manner for ease of explanation; however, it is to be understood that this arrangement is merely exemplary, and it should be recog- nized that the processing associated with the methods described herein (and the blocks shown in the Figures) may occur in a different order (for example, where at least some of the processing associated with the blocks is performed in parallel and/or in an event-driven manner).

In block 440A, time kept by a multiphase DC voltage converter 220A is synchronized with a network. Thus, time kept by the multiphase DC voltage converter 220A, e.g., by the processing system 220A-1, is synchronized with time of the RAN 220 or a network comprising the RAN. Optionally, the multiphase DC voltage converter 220A, e.g., by the processing system 220A-1, receives time data, e.g., utilizing conventional PTP and/or eSynch techniques, with which to synchronize time maintained by the processing circuitry with time maintained by the RAN 220. Optionally, block 440A, may be performed more than once, e.g., periodically and/or aperiodically.

Optionally, in block 440B, the model is determined, or received from a user or another system. Optionally, to determine the model, downlink data of known and varying number of resource elements are sent from the O-DU to the O-RU and transmitted by the O-RU. The O-RU provides at least one set of 0-RU DC power consumption and a time such O-RU DC power consumption was obtained by the O-RU. The scheduler provides at least one set of a number of resources elements to be transmitted by the O-RU and a period of time (e.g., a time block) when such resource elements are to be transmitted by the O-RU. A processing system, e.g., in the multiphase DC voltage converter 220A can then determine a model, e.g., using regression analysis, using pairs of obtained O-RU DC power consumption and a number of resource elements sent by the O-RU during the same time period (e.g., time block).

In block 440C, at least one indicium of DC radio power consumption, for a time period in the future, e.g., a resource block, is received or determined, e.g., by the multiphase DC voltage converter, e.g., by the processing system therein. Optionally, the at least one indicium of DC radio power consumption is externally determined (e.g., by another component of the RAN 220 or by a component external to the RAN 220), and thus received; alternatively, the at least one indicium of DC radio power is determined, e.g., by the multiphase DC voltage converter, e.g., the processing system therein. Optionally, the at least one indicium of DC radio power consumption is determined by:

a. receiving, e.g., from the scheduler, (i) a number of resource elements to be transmitted, e.g., by the O-RU, during a time period, e.g., a time block and (ii) a time period such resource elements are to be transmitted are received; and b. determining the at least one indicium of DC radio power consumption for the time period by transforming, with the model, the received number of resource elements into the at least one indicium of DC radio power consumption.

As described elsewhere herein, the model may transform a number of resource elements into DC radio power consumption. If the at least one indicium of DC radio power consumption includes a number of phase(s) to be enabled and/or disabled, this may be determined from the determined DC radio power consumption as discussed elsewhere herein.

Optionally, in block 440D, if at least one indicium of DC radio power consumption does not specify specific phase(s) and/or a number of phase(s) to be enabled and/or disabled at a time period, but specifies an expected DC power consumption of the O-RU at a time period, then a number of phase(s) to be enabled and/or disabled, at the time period of the multiphase DC voltage converter is determined. Phase(s) which are not enabled are disabled. Each phase provides an equal DC power, e.g., an equal DC current, output and equal DC voltage output. Each phase provides a maximum DC power, e.g., DC current, output. Determination of a number of phase(s) to be enabled may be determined by ascertaining a number of phases, which when enabled, provides at least the expected DC radio power consumption at the time period of time. If the analysis is based upon power, the maximum DC power output of each phase may be divided into the expected DC power consumption of the O-RU at the time period; then, the resulting number, i.e., dividend, is rounded up to the next highest integer, i.e., a ceiling function is applied. Alternatively, if the analysis is based upon current, the maximum DC current of each phase is divided into the expected DC current consumption of the O-RU at the time period. The DC current consumption of the O-RU may be obtained by dividing a voltage maintained at the DC O-RU input by the expected DC power consumption of the O-RU at the time period. Then, the ceiling function is applied. The number of phase(s) to disable can be determined by subtracting a number of phase(s) to enable from a total number of phases of the multiphase DC voltage converter.

Optionally, power dissipation of the second conductors may have to be accounted for when determining the DC power to be provided by the output of the multiphase DC voltage converter—when the O-RU and the multiphase DC voltage converter are remote. Optionally, the O-RU may be on a mounting structure, e.g., a tower, and the multiphase DC voltage converter may be located at the base of the mounting structure. In such an event, the resistance of the second conductors electrically connecting the multiphase DC voltage converter and the O-RU 220C are known, e.g., by measurement or by being determined through input provided by an entity, a user or another system. Further, a desired 0-RU input DC voltage is known; the multiphase DC voltage converter is configured to maintain this desired 0-RU input DC voltage regardless of variations in DC voltage drop in the second conductors due to variations in current flow drawn by the O-RU through the second conductors. The current flow through the second conductors at a time period, e.g., time block, can be determined by dividing the expected DC radio power consumption at the time period provided by the model by the desired 0-RU input DC voltage. The DC power loss in the second conductors can be determined by multiplying the resistance of the second conductors by the determined current flow through the second conductors. The number of phase(s) to enable is calculated as above using power or current, but by dividing the maximum DC power or DC current per phase by a sum of the expected DC power or current consumption of each of the O-RU and second conductors at a time period, and then applying the ceiling function.

In block 440E, the determined number of phases are enabled and/or disabled at or about the period of time. Optionally, such enablement and/or disablement of phases may be performed at a commencement of the time period. Optionally, to avoid transients, when increasing or decreasing DC power provided to the O-RU, the DC power provided to the O-RU may be respectively increased at first time epoch before the period of time or decreased at a second time epoch after commencement of the period of time. The first and second time periods may be the same or different. Optionally, the first and second time epochs are a fraction of a time block.

The processor systems (or processor circuitry), cloud computing systems (or cloud computing circuitry), and servers (server circuitry) disclosed herein may comprise state machines, neural network, and/or other types of computing systems. Such systems may comprise processing circuitry coupled to memory circuitry. The processing circuitry may include one or more microprocessors, microcontrollers, digital signal processing (DSP) elements, application-specific integrated circuits (ASICs), and/or field programmable gate arrays (FPGAs). The processor system may include or function with software programs, firmware, or other computer readable instructions, e.g., stored in the memory circuitry, for carrying out various process tasks, calculations, and control functions, used in the methods described herein. These instructions are typically tangibly embodied on any storage media (or computer readable medium) used for storage of computer readable instructions or data structures.

The memory circuitry can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk—Read Only Memory (CD-ROM), DVDs, Blu-Ray discs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory.

Methods of the invention can be implemented in computer readable instructions, such as program modules or applications, which may be stored in the computer readable medium and executed by the processing circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

Example Embodiments

Example 1 includes a method of more efficiently operating a multiphase direct current (DC) voltage converter configured to provide DC power to a radio, comprising: synchronizing time, kept by the multiphase DC voltage converter, with a network comprising the radio; determining with a model, or receiving, at least one indicium of DC power consumption of the radio for a time period in a future; determining, for the time period, at least one of (a) a first number of at least one phase of the multiphase DC voltage converter to enable, and (b) a second number of at least one phase of the multiphase DC voltage converter to disable; and at least one of (a) enabling the first number of the at least one phase at one of: (i) a first time epoch before a commencement of the time period and (ii) at a commencement of the time period, and (b) disabling the second number of the at least one phase at one of: (x) a second time epoch after the commencement of the time period and (y) at the commencement of the time period.

Example 2 includes the method of Example 1, wherein the at least one indicium of DC power consumption of the radio is received with the time period.

Example 3 includes the method of any of Examples 1-2, wherein determining with the model the at least one indicium of DC power consumption comprises: receiving (a) a number of resource elements to be transmitted by the radio at the time period, and (b) the time period; and determining the at least one indicium of DC radio power consumption for the time period by transforming, with the model, the received number of resource elements into the at least one indicium of DC radio power consumption.

Example 4 includes the method of Example 3, further comprising determining or receiving the model; wherein determining the model comprises: receiving, from the radio, DC power consumption of the radio during different time periods; receiving an amount of resource elements transmitted by the radio during the different time periods; and determining, with regression analysis, the model.

Example 5 includes the method of any of Examples 1-4, further comprising determining a number of phases, of the multiphase DC power converter, to enable or disable during the time period; wherein determining the number of phases to enable during a time period comprises: determining a dividend by dividing an expected DC power consumption at the time period by a maximum DC power output of each phase; performing a ceiling function on a dividend; and wherein the expected DC power consumption comprises an expected DC power consumption of the radio at the time period; wherein the at least one indicium of DC power consumption of the radio comprises the expected DC power consumption of the radio at the time period.

Example 6 includes the method of Example 5, wherein the expected DC power consumption consists of a sum of an expected DC power consumption of the radio and a DC power loss in conductors connecting the multiphase DC voltage converter to radio.

Example 7 includes the method of any of Examples 1-6, wherein the first time epoch and the second time epoch are equal.

Example 8 includes a program product comprising a processor readable non-transitory medium on which program instructions are embodied, wherein the program instructions are configured, when executed by at least one programmable processor, to cause the at least one programmable processor to perform a method of more efficiently operating a multiphase direct current (DC) voltage converter configured to provide DC power to a radio, comprising: synchronizing time, kept by the multiphase DC voltage converter, with a network comprising the radio; determining with a model, or receiving, at least one indicium of DC power consumption of the radio for a time period in a future; determining, for the time period, at least one of (a) a first number of at least one phase of the multiphase DC voltage converter to enable, and (b) a second number of at least one phase of the multiphase DC voltage converter to disable; and at least one of (a) enabling the first number of the at least one phase at one of: (i) a first time epoch before a commencement of the time period and (ii) at a commencement of the time period, and (b) disabling the second number of the at least one phase at one of: (x) a second time epoch after the commencement of the time period and (y) at the commencement of the time period.

Example 9 includes the program product of Example 8, wherein the at least one indicium of DC power consumption of the radio is received with the time period.

Example 10 includes the program product of any of Examples 8-9, wherein determining with the model the at least one indicium of DC power consumption comprises: receiving (a) a number of resource elements to be transmitted by the radio at the time period, and (b) the time period; and determining the at least one indicium of DC radio power consumption for the time period by transforming, with the model, the received number of resource elements into the at least one indicium of DC radio power consumption.

Example 11 includes the program product of Example 10, wherein the method further comprises determining or receiving the model; wherein determining the model comprises: receiving, from the radio, DC power consumption of the radio during different time periods; receiving an amount of resource elements transmitted by the radio during the different time periods; and determining, with regression analysis, the model.

Example 12 includes the program product of any of Examples 8-11, wherein the method further comprises determining a number of phases, of the multiphase DC power converter, to enable or disable during the time period; wherein determining the number of phases to enable during a time period comprises: determining a dividend by dividing an expected DC power consumption at the time period by a maximum DC power output of each phase; performing a ceiling function on a dividend; and wherein the expected DC power consumption comprises an expected DC power consumption of the radio at the time period; wherein the at least one indicium of DC power consumption of the radio comprises the expected DC power consumption of the radio at the time period.

Example 13 includes the program product of Example 12, wherein the expected DC power consumption consists of a sum of an expected DC power consumption of the radio and a DC power loss in conductors connecting the multiphase DC voltage converter to radio.

Example 14 includes the program product of Example 9, wherein the first time epoch and the second time epoch are equal.

Example 15 includes a multiphase direct current (DC) voltage converter configured to provide DC power to a radio, comprising: input conductors configured to receive an input DC voltage; output conductors; multiphase DC voltage conversion circuitry comprising an input electrically coupled to the input conductors and an output electrically coupled to the output conductors; and processing circuitry communicatively coupled to the multiphase DC voltage conversion circuitry and configured to: synchronize time, kept by the processing circuitry, with a network comprising the radio; determine with a model, or receive, at least one indicium of DC power consumption of the radio for a time period in a future; determine, for the time period, at least one of (a) a first number of at least one phase of the multiphase DC voltage converter to enable, and (b) a second number of at least one phase of the multiphase DC voltage converter to disable; and at least one of (a) enable the first number of the at least one phase at one of: (i) a first time epoch before a commencement of the time period and (ii) at a commencement of the time period, and (b) disable the second number of the at least one phase at one of: (x) a second time epoch after the commencement of the time period and (y) at the commencement of the time period.

Example 16 includes the multiphase DC voltage converter of Example 15, wherein the at least one indicium of DC power consumption of the radio is received with the time period.

Example 17 includes the multiphase DC voltage converter of any of Examples 15-16, wherein determining with the model the at least one indicium of DC power consumption comprises: receive (a) a number of resource elements to be transmitted by the radio at the time period, and (b) the time period; and determine the at least one indicium of DC radio power consumption for the time period by transforming, with the model, the received number of resource elements into the at least one indicium of DC radio power consumption.

Example 18 includes the multiphase DC voltage converter of Example 17, wherein the processing circuitry further configured to determine or receive the model; wherein determining the model comprises: receive, from the radio, DC power consumption of the radio during different time periods; receive an amount of resource elements transmitted by the radio during the different time periods; and determine, with regression analysis, the model.

Example 19 includes the multiphase DC voltage converter of any of Examples 15-18, wherein the processing circuitry is further configured to determine a number of phases, of the multiphase DC power converter, to enable or disable during the time period; wherein determining the number of phases to enable during a time period comprises: determine a dividend by dividing an expected DC power consumption at the time period by a maximum DC power output of each phase; perform a ceiling function on a dividend; and wherein the expected DC power consumption comprises an expected DC power consumption of the radio at the time period;

wherein the at least one indicium of DC power consumption of the radio comprises the expected DC power consumption of the radio at the time period.

Example 20 includes the multiphase DC voltage converter of Example 19, wherein the expected DC power consumption consists of a sum of an expected DC power consumption of the radio and a DC power loss in conductors connecting the multiphase DC voltage converter to radio.

Example 21 includes the multiphase DC voltage converter of any of Examples 15-20, wherein the first time epoch and the second time epoch are equal.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method of more efficiently operating a multiphase direct current (DC) voltage converter configured to provide DC power to a radio, the method comprising:
synchronizing time, kept by the multiphase DC voltage converter, with a network comprising the radio;
determining with a model, or receiving, at least one indicium of DC power consumption of the radio for a time period in a future;
determining, for the time period, at least one of (a) a first number of at least one phase of the multiphase DC voltage converter to enable, and (b) a second number of at least one phase of the multiphase DC voltage converter to disable; and
at least one of (a) enabling the first number of the at least one phase at one of: (i) a first time epoch before a commencement of the time period and (ii) at a commencement of the time period, and (b) disabling the second number of the at least one phase at one of: (x) a second time epoch after the commencement of the time period and (y) at the commencement of the time period;
wherein determining with the model the at least one indicium of DC power consumption comprises:
receiving (a) a number of resource elements to be transmitted by the radio at the time period, and (b) the time period; and
determining the at least one indicium of DC radio power consumption for the time period by transforming, with the model, the received number of resource elements into the at least one indicium of DC radio power consumption.

2. The method of claim 1, wherein the at least one indicium of DC power consumption of the radio is received with the time period.

3. The method of claim 1, further comprising determining or receiving the model;
wherein determining the model comprises:
receiving, from the radio, DC power consumption of the radio during different time periods;
receiving an amount of resource elements transmitted by the radio during the different time periods; and
determining, with regression analysis, the model.

4. The method of claim 1, further comprising determining a number of phases, of the multiphase DC power converter, to enable or disable during the time period;
wherein determining the number of phases to enable during a time period comprises:

17

18 determining a dividend by dividing an expected DC power consumption at the time period by a maximum DC power output of each phase;

performing a ceiling function on a dividend; and wherein the expected DC power consumption comprises an expected DC power consumption of the radio at the time period;

wherein the at least one indicium of DC power consumption of the radio comprises the expected DC power consumption of the radio at the time period.

5. The method of claim 4, wherein the expected DC power consumption consists of a sum of an expected DC power consumption of the radio and a DC power loss in conductors connecting the multiphase DC voltage converter to radio.

6. The method of claim 1, wherein the first time epoch and the second time epoch are equal.

7. A program product comprising a processor readable non-transitory medium on which program instructions are embodied, wherein the program instructions are configured, when executed by at least one programmable processor, to cause the at least one programmable processor to perform a method of more efficiently operating a multiphase direct current (DC) voltage converter configured to provide DC power to a radio, the method comprising:

synchronizing time, kept by the multiphase DC voltage converter, with a network comprising the radio;

determining with a model, or receiving, at least one indicium of DC power consumption of the radio for a time period in a future;

determining, for the time period, at least one of (a) a first number of at least one phase of the multiphase DC voltage converter to enable, and (b) a second number of at least one phase of the multiphase DC voltage converter to disable; and at least one of (a) enabling the first number of the at least one phase at one of: (i) a first time epoch before a commencement of the time period and (ii) at a commencement of the time period, and (b) disabling the second number of the at least one phase at one of: (x) a second time epoch after the commencement of the time period and (y) at the commencement of the time period;

wherein determining with the model the at least one indicium of DC power consumption comprises:

receiving (a) a number of resource elements to be transmitted by the radio at the time period, and (b) the time period; and determining the at least one indicium of DC radio power consumption for the time period by transforming, with the model, the received number of resource elements into the at least one indicium of DC radio power consumption.

8. The program product of claim 7, wherein the at least one indicium of DC power consumption of the radio is received with the time period.

9. The program product of claim 7, wherein the method further comprises determining or receiving the model;

wherein determining the model comprises:

receiving, from the radio, DC power consumption of the radio during different time periods;

receiving an amount of resource elements transmitted by the radio during the different time periods; and determining, with regression analysis, the model.

10. The program product of claim 7, wherein the method further comprises determining a number of phases, of the multiphase DC power converter, to enable or disable during the time period;

wherein determining the number of phases to enable during a time period comprises:

determining a dividend by dividing an expected DC power consumption at the time period by a maximum DC power output of each phase;

performing a ceiling function on a dividend; and wherein the expected DC power consumption comprises an expected DC power consumption of the radio at the time period;

wherein the at least one indicium of DC power consumption of the radio comprises the expected DC power consumption of the radio at the time period.

11. The program product of claim 10, wherein the expected DC power consumption consists of a sum of an expected DC power consumption of the radio and a DC power loss in conductors connecting the multiphase DC voltage converter to radio.

12. The program product of claim 8, wherein the first time epoch and the second time epoch are equal.

13. A multiphase direct current (DC) voltage converter configured to provide DC power to a radio, the multiphase DC voltage converter comprising:

input conductors configured to receive an input DC voltage;

output conductors;

multiphase DC voltage conversion circuitry comprising an input electrically coupled to the input conductors and an output electrically coupled to the output conductors; and processing circuitry communicatively coupled to the multiphase DC voltage conversion circuitry and configured to:

synchronize time, kept by the processing circuitry, with a network comprising the radio;

determine with a model, or receive, at least one indicium of DC power consumption of the radio for a time period in a future;

determine, for the time period, at least one of (a) a first number of at least one phase of the multiphase DC voltage converter to enable, and (b) a second number of at least one phase of the multiphase DC voltage converter to disable; and at least one of (a) enable the first number of the at least one phase at one of: (i) a first time epoch before a commencement of the time period and (ii) at a commencement of the time period, and (b) disable the second number of the at least one phase at one of: (x) a second time epoch after the commencement of the time period and (y) at the commencement of the time period;

wherein determining with the model the at least one indicium of DC power consumption comprises:

receive (a) a number of resource elements to be transmitted by the radio at the time period, and (b) the time period; and determine the at least one indicium of DC radio power consumption for the time period by transforming, with the model, the received number of resource elements into the at least one indicium of DC radio power consumption.

14. The multiphase DC voltage converter of claim 13, wherein the at least one indicium of DC power consumption of the radio is received with the time period.

15. The multiphase DC voltage converter of claim 13, wherein the processing circuitry is further configured to determine or receive the model;

wherein determining the model comprises:

receive, from the radio, DC power consumption of the radio during different time periods;

receive an amount of resource elements transmitted by the radio during the different time periods; and determine, with regression analysis, the model.

16. The multiphase DC voltage converter of claim 13, wherein the processing circuitry is further configured to determine a number of phases, of the multiphase DC power converter, to enable or disable during the time period;

wherein determining the number of phases to enable during a time period comprises:

determine a dividend by dividing an expected DC power consumption at the time period by a maximum DC power output of each phase;

perform a ceiling function on a dividend; and wherein the expected DC power consumption comprises an expected DC power consumption of the radio at the time period;

wherein the at least one indicium of DC power consumption of the radio comprises the expected DC power consumption of the radio at the time period.

17. The multiphase DC voltage converter of claim 16, wherein the expected DC power consumption consists of a sum of an expected DC power consumption of the radio and a DC power loss in conductors connecting the multiphase DC voltage converter to radio.

18. The multiphase DC voltage converter of claim 13, wherein the first time epoch and the second time epoch are equal.

* * * * *